United States Patent
Stolzberg

(10) Patent No.: US 10,931,940 B2
(45) Date of Patent: Feb. 23, 2021

(54) VIRTUAL DISPLAY ENGINE

(71) Applicant: Holonyne Corporation, El Segundo, CA (US)

(72) Inventor: Jon Stolzberg, El Segundo, CA (US)

(*) Notice: Subject to any disclaimer, the term of this patent is extended or adjusted under 35 U.S.C. 154(b) by 0 days.

(21) Appl. No.: 15/859,049

(22) Filed: Dec. 29, 2017

(65) Prior Publication Data
US 2018/0192042 A1  Jul. 5, 2018

Related U.S. Application Data

(60) Provisional application No. 62/440,524, filed on Dec. 30, 2016.

(51) Int. Cl.
| | |
|---|---|
| *H04N 13/363* | (2018.01) |
| *H04N 21/41* | (2011.01) |
| *H04N 21/43* | (2011.01) |
| *G06F 3/14* | (2006.01) |
| *H04N 9/31* | (2006.01) |
| *G09G 5/12* | (2006.01) |
| *G09G 5/00* | (2006.01) |
| *H04N 21/4402* | (2011.01) |

(Continued)

(52) U.S. Cl.
CPC ......... *H04N 13/363* (2018.05); *G06F 3/1423* (2013.01); *G09G 5/003* (2013.01); *G09G 5/12* (2013.01); *H04N 9/31* (2013.01); *H04N 9/3147* (2013.01); *H04N 9/3179* (2013.01); *H04N 9/3194* (2013.01); *H04N 13/302* (2018.05); *H04N 21/4122* (2013.01); *H04N 21/41415* (2013.01); *H04N 21/4307* (2013.01); *H04N 21/440263* (2013.01); *G09G 2300/026* (2013.01); *G09G 2340/12* (2013.01); *G09G 2354/00* (2013.01)

(58) Field of Classification Search
CPC .......... H04N 9/13; H04N 13/04; H04N 21/41; H04N 13/30; H04N 13/36; H04N 13/20
See application file for complete search history.

(56) References Cited

U.S. PATENT DOCUMENTS

| | | | |
|---|---|---|---|
| 2010/0097444 A1 | 4/2010 | Lablans | |
| 2016/0132278 A1 | 5/2016 | Gillard | |

(Continued)

FOREIGN PATENT DOCUMENTS

KR    1020130010657 B1 *  9/2013  ............... H04N 5/45

OTHER PUBLICATIONS

ISA/U.S., International Search Report in copending PCT International Appln. No. PCT/US2017/69111, dated Mar. 26, 2018.

*Primary Examiner* — Michelle M Iacoletti
*Assistant Examiner* — Danell L Owens
(74) *Attorney, Agent, or Firm* — Robert W. Dickerson

(57) ABSTRACT

A computer implemented method for mapping video to a video wall. The method provides for receiving, by one or more computing devices, content comprising pixel data. The method also provides for generating, by the one or more computing devices, a pixel space. The pixel data is associated with the pixel space by the one or more computing devices. One or more virtual cameras are generated by the one or more computing devices. A portion of the pixel space is captured by the one or more computing devices, and the portion of the pixel space captured by the one or more virtual cameras for display on the video wall is outputted by the one or more computing devices.

12 Claims, 7 Drawing Sheets

(51) Int. Cl.
*H04N 13/302* (2018.01)
*H04N 21/414* (2011.01)
*H04N 13/30* (2018.01)

(56) References Cited

U.S. PATENT DOCUMENTS

2016/0210769 A1* 7/2016 Suryanarayana ....... G06T 11/60
2017/0064295 A1   3/2017 Stolzberg

* cited by examiner

601

VIRTUAL DISPLAY ENGINE

BACKGROUND

The present disclosure relates to displays. More particularly, the present disclosure is directed to a multi-screen display system.

As display technology has improved, there is an ever increasing need to manage massive complex visual information structures. The amount of visual data being created and stored is accelerating faster than the evolution of effective tools to manage it and to extract value from it. A multi-screen display system, sometimes referred to as a video wall, may be used to present visual content such as presentations, films, television shows, advertisements, food menus, scoreboards, etc. One or more of these content types may be mapped to particular portions of a display or the entirety of the display area.

Hardware and software solutions are available which control the displaying of content on video walls. However, the hardware and software currently available are unintuitive to operate, and inflexible with what actions they can perform. Thus, available hardware and software are limited in their respective capabilities, and difficult for untrained users to operate.

Accordingly, there is a need for system and methods which provide the ability to intuitively map content to a video wall. There is also a need for a platform having hardware and software working together to enable a systematic, rational approach to effective design and information delivery that is based on a coherent set of aesthetic principles. There is an additional need for a platform that adds value to information by increasing its efficiency and efficacy when driving video walls as delivery channels for complex information or storytelling scenarios. There is also a need for a platform to intelligently and efficiently access and manage visual data and present it on multiscreen systems in intelligent ways, adding value to the information in multiple verticals. There is an additional need for a platform that uses multiple displays to deliver visual information and uses that display real estate (that is, the area on the displays available for presenting visual information) to present the information in intelligent ways, thereby increasing its value. The present invention satisfies these needs and provides other related advantages.

SUMMARY

The present invention provides system and methods which provide the ability to intuitively map content to a video wall. The present invention also provides a platform to intelligently and efficiently access and manage visual data and present it on multiscreen systems in intelligent ways, adding value to the information in multiple verticals. The present invention further provides a platform that uses multiple displays to deliver visual information and uses that display real estate to present the information in intelligent ways, thereby increasing its value.

A platform or system is disclosed herein that provides an integrated suite of hardware and software tools that are used to create and operate a multi-screen display. The system uses highly configured off-the-shelf hardware driven by customized software. The system is modular in structure so that each component can be upgraded over time as new capabilities are added to the media servers, network interface, signal distribution equipment, media transceivers, display components, user interface components, and other elements.

A digital content format is disclosed herein that combines multiple visual elements for simultaneous display on multi-screen or multi-image display systems, in physical or virtual space. The digital content format uses specific design techniques and programming tools to map multiple images onto multiple display units in order to optimize the viewing experience. The multi-image format engages viewers and users in an active relationship with the content, encouraging the development of media literacy and critical comprehension skills.

The system disclosed herein can provide sophisticated search and management tools to acquire visual data from massive archives or network infrastructures, and then display that data in an optimal format that increases its value by delivering it more efficiently and effectively than is possible on single screens. Also, the system disclosed herein can deliver both content and context simultaneously, making it extremely effective as an educational tool and learning system. Furthermore, the system can deliver content with extremely high resolutions using non-standard file formats and aspect ratios. Additionally, the system disclosed herein can be driven by Artificial Intelligence (AI) systems, using AI to both search and acquire visual assets, and then to display them in the most effective way possible according to dynamically changing criteria. AI can also execute complex processing techniques that allow greater throughput of imagery to be displayed over a given network bandwidth without a corresponding loss of perceived resolution. The system disclosed herein can be configured to deliver new forms of digital entertainment and gaming that are out-of-home ticketed experiences, and are not susceptible to hacking and piracy. The system disclosed herein can provide an entertainment experience having an immersive environment using standard video production techniques because the experience is compiled from multiple elements in real-time, and the need to spend a significant amount of time and money compositing a large-format master file is eliminated. Furthermore, the system includes a fluid interface that allows content creators to make changes to their presentations in real-time—encouraging creative risk taking and increasing the likelihood that more effective engagement with viewers will be achieved.

The system disclosed herein can provide the equivalent of a website, but with some key differences. For example, websites are primarily for access on a desktop computer or mobile device, whereas the system disclosed herein may be accessed using sophisticated display processing equipment to drive multiple displays or multi-image arrays on large-format single displays. Whereas websites are generally limited in resolution to 1080P or maybe 4K on newer devices/monitors, the system disclosed herein has no upper limit to resolution since an illustrative multi-screen display may be modular and scalable in structure. Any number of screens can be included in the system, and the system's software can accommodate the programming needs of any sized video wall. Whereas websites are generally accessed using one browser on one screen, the system disclosed herein can display multiple types of information or imagery on multiple screens simultaneously, with intelligent display mapping to create optimal impact and maximize the value of the content/information.

The system disclosed herein may share some common general functions with a website. For example, they can both deliver information, entertainment, educational material, gaming, all kinds of content in every language and in every corner of the world. In another example, they can both function as communications devices (primarily for an individual in the case of a website, and primarily for groups in the case of the system disclosed herein). In yet another example, they are both portals/extensions of virtual space into the physical world. In any additional example, they can both function in interactive modalities using a number of interface techniques; allowing each of them to act as portals/extensions of the physical world into the virtual world.

Embodiments within the disclosure relate generally to intelligent management of visual information on large-scale multi-screen display systems mapping video to a video wall. One aspect includes a method for receiving, by one or more computing devices, content comprising pixel data, generating a pixel space and associating the pixel data with the pixel spaces. The one or more computing devices may generate one or more virtual cameras. The one or more virtual cameras capture a portion of the pixel space and the one or more computing devices output the portion of the pixel space captured by the one or more virtual cameras for display on the video wall.

In some embodiments, the content is video and the pixel data is a frame of the video.

In some embodiments, the one or more computing devices generate a configuration file based on received inputs, wherein the configuration file selects the content and defines the size and shape of the pixel space.

In some embodiments, the video wall comprises one or more displays.

In some embodiments, the video wall is a virtual video wall.

In some embodiments, the video wall is a simulated video wall.

In some embodiments, one or more media transceivers are each associated with one or more displays.

In some embodiments, each of the one or more virtual cameras is associated with one or more of the one or more media transceivers.

In some embodiments, outputting the portion of the pixel space captured by the one or more virtual cameras for display on the video wall comprises: receiving, by each one or more transceivers, the portion of the pixel space captured by the one or more virtual cameras associated with that respective one or more transceivers; synchronizing playback on the one or more the displays; and displaying, by the one or more displays, the pixel space received by the one or more receivers.

In some embodiments, the method further comprises processing the pixel data according to instructions provided by the videowall engine or by an integrated external system.

Another aspect of the present technology may include a system for mapping video to a video wall. The system may include one or more computing devices and memory storing instructions, the instructions executable by the one or more computing devices. The instructions may include receiving, by the one or more computing devices, content comprising pixel data; generating, by the one or more computing devices, a pixel space; associating, by the one or more computing devices, the pixel data with the pixel space; generating, by the one or more computing devices, one or more virtual cameras; capturing, by the one or more virtual cameras, a portion of the pixel space; outputting, by the one or more computing devices, the portion of the pixel space captured by the one or more virtual cameras for display on the video wall.

Another aspect of the present technology may include a non-transitory computer-readable medium storing instructions that, when executed by one or more processors, cause the one or more processors to perform the steps of: receiving content comprising pixel data; generating a pixel space; associating the pixel data with the pixel space; generating one or more virtual cameras; capturing a portion of the pixel space; and outputting the portion of the pixel space captured by the one or more virtual cameras for display on the video wall.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the drawings, specific terminology may be used for the sake of clarity. However, the aspects of the invention are not intended to be limited to the specific terms used. Likewise, the aspects of the invention are not intended to be limited to specific pictograms used to illustrate various components. The illustrated embodiments are intended to illustrate, but not to limit the invention.

DETAILED DESCRIPTION

Figure 1:
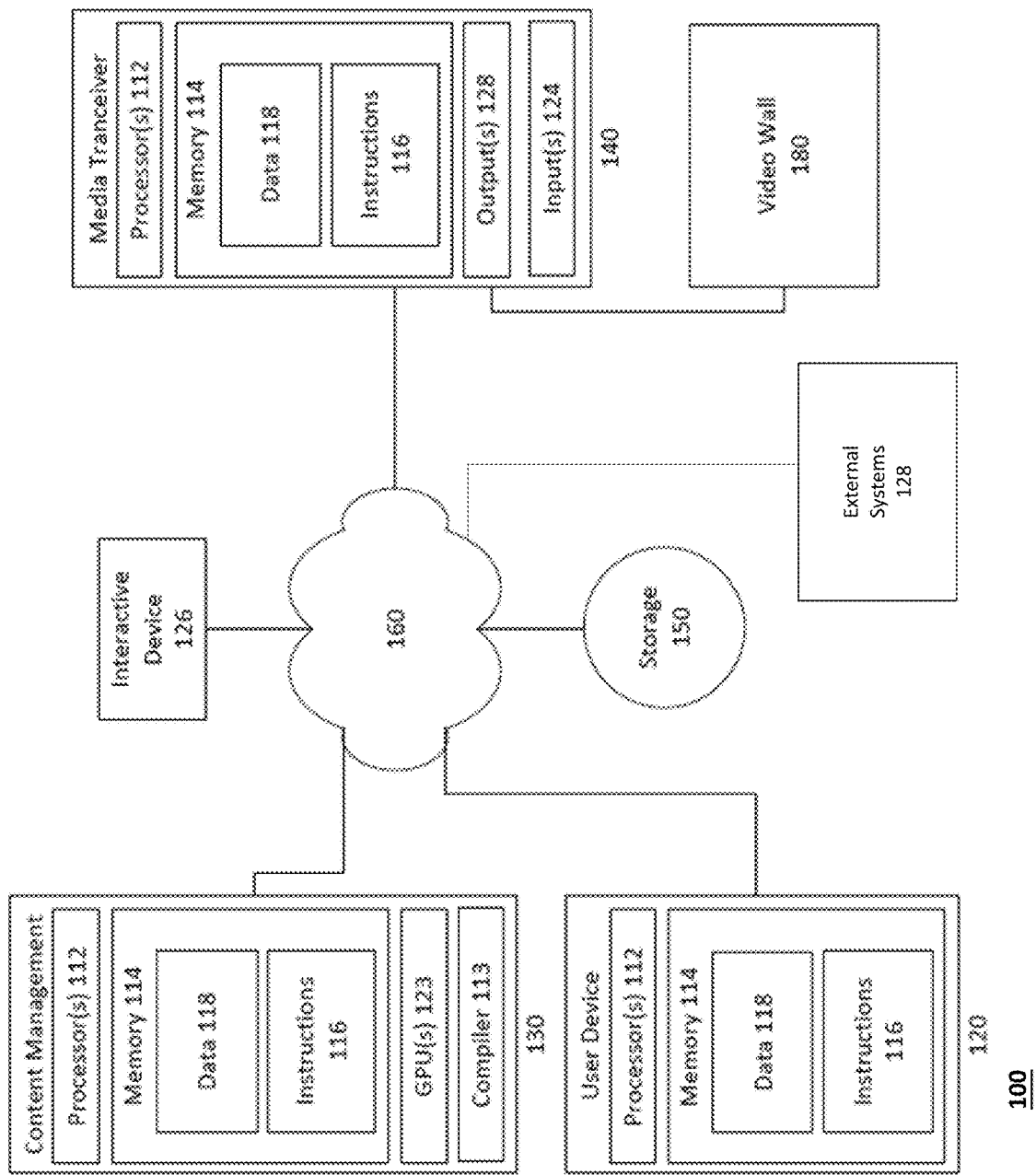
FIG. 1 illustrates a functional diagram of an embodiment of a system in accordance with aspects of the disclosure.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. The lowest layer is an application layer that is executed on client computers. In this example, the application allows a client to access cloud storage. Above the application layer is a cloud platform and cloud infrastructure, including a "server" layer that includes hardware and computer software designed for cloud-specific services.

Use of the word "video", as used herein is not intended to be limiting. Embodiments of the platform disclosed herein are directed to multiple forms of visual information in mega-resolution and non-standard formats that may or may not be classifiable under the term "video".

This technology relates to, by way of example, using a videowall engine to control the display of content on a video wall. The technology enables a user to access a videowall control application which can manage the displaying of content on a video wall. For instance, the user may operate the videowall content control application to customize and generate a configuration file. The configuration file may include instructions which control the content which is played, when the content is played, the timing of the playback of the content, how the content is mapped to the video wall, and other functions described herein. Various control options include, without limitation, a desktop (browser), Artificial Intelligence (AI) management, Internet, Interactive, tablet device, smartphone, or the like. Various display options include, without limitation, active/passive, stereoscopic, autostereoscopic, virtual reality (VR), augmented reality (AR), Light Emitting Diode (LED) (direct view), LCD matrix, Organic Light Emitting Diode (OLED), projection, multi-projection, holographic, or the like.

The videowall control application may pass the configuration file into a compiler which may then transform the configuration instructions into machine readable language instructions and data which are executable and/or readable by a processor. Based on the instructions, the processor may then transmit content to a videowall engine. Content may include, but is not limited to, all types of multimedia including video files, live action recordings, two and/or three dimensional virtual reality content, audio content, 3D objects, etc. The processor may also instruct the videowall engine how the particular content is to be mapped to a video wall. In this regard, the processor may provide the videowall engine with video wall data regarding the number of displays in the video wall, the resolution of the displays, and the locations of the displays relative to one another. The compiled instructions also include machine readable language instructions and data which are executable and/or readable by various components including, but not limited to the transceivers, the audio system, the interactive systems (including AI, AR etc.) and other peripheral components that are either part of the physical system or connected to the system via networking protocols and other signal distribution technologies. In this regard, the transceivers are able to select between the signals sent over their network and then know exactly what kind of local processing to undertake before the transceivers display the signal. This local processing can include adding special effects, scaling, freezing or running images, etc.

The videowall engine may map the content to particular locations on particular displays. The videowall engine may include software that integrates with computer processors and graphic processing units to process content in real-time. In this regard, the videowall engine may generate a virtual camera for each display in the video wall or for groups of displays in the video wall. Based upon the video wall data, each virtual camera may receive the content associated with the location of the display or groups of displays to which the virtual camera corresponds. The videowall control application may then transmit the content associated to the display or groups of displays to one or more media transceivers.

Media transceivers may receive and decode the transmitted content and provide the content for display on the video wall. Each display or group of displays may be connected to and associated with a particular media transceiver. Each particular media transceiver associated with the particular display or groups of displays may receive the transmitted content associated therewith. Each media transceiver may then display its associated content on the video wall.

The features described herein may allow for methods and systems which provide users with the ability to intuitively and easily control the displaying of content on a video wall. In this regard, users may be provided an easy to operate program which may be used to arrange and display content on a video wall. Such features may provide users with the ability to create and design highly customizable narrative content, including movies, television, plays, etc., for display on the video wall. Further, the features described herein may allow for interactive content which may be updated in real-time for display on a highly scalable system.

Example Systems

Figure 2:
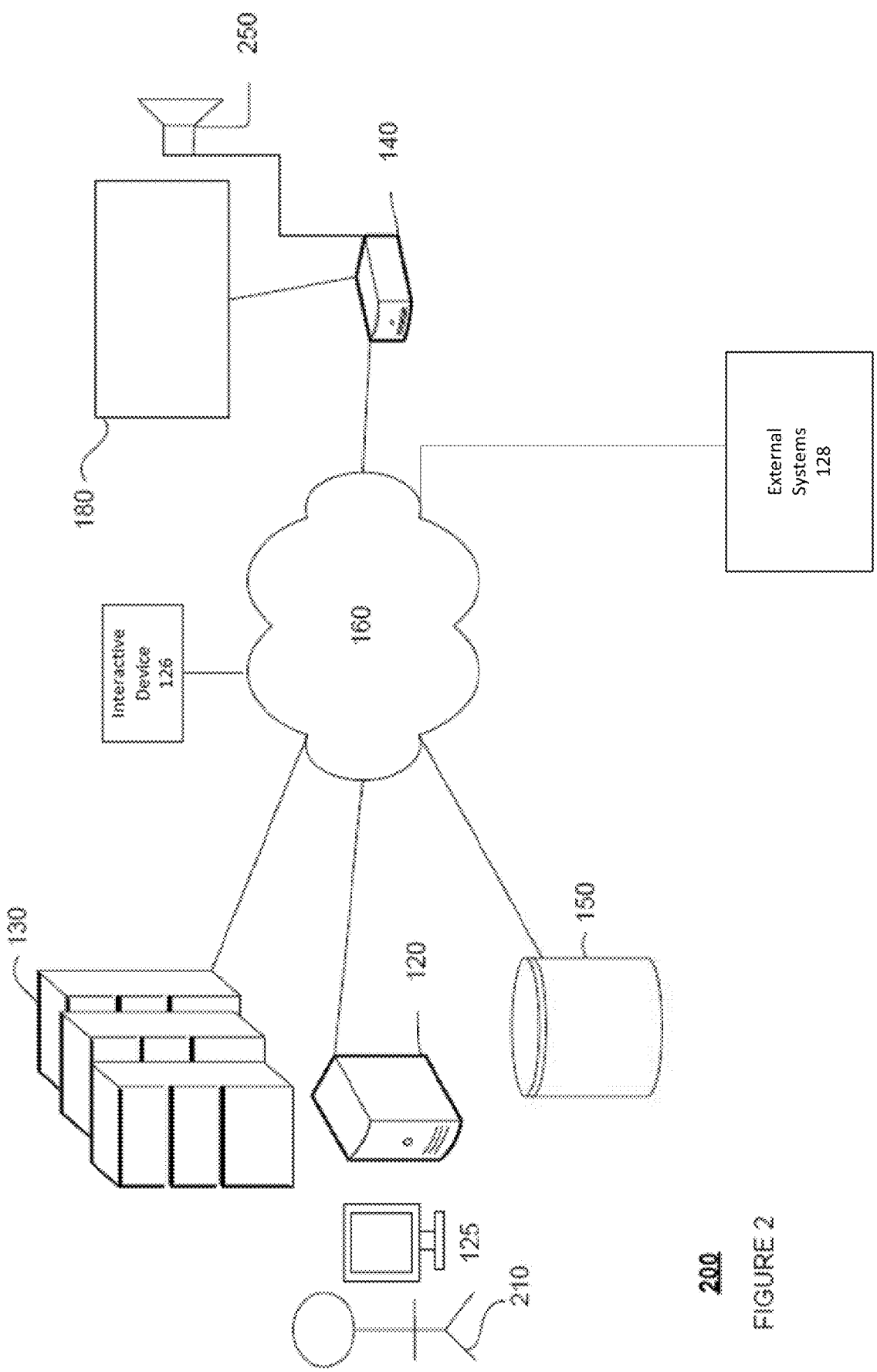
FIG. 2 illustrates a pictorial diagram of the system of FIG. 1.

FIGS. 1 and 2 illustrate an embodiment of a system 100 in which the features described above may be implemented.

It should not be considered as limiting the scope of the disclosure or usefulness of the features described herein. In this example, system 100 can include a number of computing devices including, but not limited to, a user device 120, a content management system 130, and a media transceiver 140. The system 100 also includes, but is not limited to, a storage system 150, an audio system 250, an interactive device 126, an external information acquisition and management system (or external system) 128, and a video wall 180. Each computing device 120, 130, 140 can contain one or more processors (CPUs) 112, memory 114 and other components typically present in general purpose computing devices. Each computing device 120, 130, 140 may communicate directly and/or indirectly with other computing devices and components connected to a network 160. The system 100 relies on various networks to distribute content and instruction sets. For example, externally, the system 100 uses one or more networks (e.g., a large network, a small network, a local area network (LAN), a wide area network (WAN) or the like) to locate and deliver visual information, and even to transmit information back out to other systems 100 or any other sites. Although FIG. 2 illustrates the audio system 250 as being connected to the media transceiver 140, another option is to connect the audio system 250 to the content management system 130. The system 100 may also be connected to Artificial Intelligence systems, Augmented Reality systems, or the like via the network 160.

The memory 114 of each of the computing devices 120, 130, 140 can store information accessible by the one or more processors 112, including instructions 116 that can be executed by the one or more processors 112. The memory 114 can also include data 118 that can be retrieved, manipulated or stored by the one or more processors 112. The memory 114 can be of any non-transitory type capable of storing information accessible by the one or more processors 112, such as a solid state hard drive (SSD), disk based hard-drive, memory card, ROM, RAM, DVD, CD-ROM, Blu-Ray, write-capable, and read-only memories. The data 118 can comprise any information sufficient to identify relevant information including, but not limited to, numbers, descriptive text, proprietary codes, pointers, references to data stored in other memories such as at other network locations, or information that is used by a function to calculate the relevant data. The data 118 may also include, but is not limited to, any type of digital multimedia content including electronic documents, holographic media, pictures, videos, music, audio, control signals such as MIDI, DMX, RS-232, RS-422, 3D objects in a variety of file formats, and other such multimedia.

The instructions 116 can be any set of instructions to be executed directly, such as machine code, or indirectly, such as scripts, by the one or more processors 112. In that regard, the terms "instructions," "application," "steps," and "programs" can be used interchangeably herein. The instructions can be stored in a proprietary videowall language, object code format for direct processing by the one or more processors 112, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data 118 can be stored in computer registers, in a relational or non-relational database as a table having many different fields and records, or XML documents.

Each computing device 120, 130, 140 may include a compiler 113 which may compile the data 118 and instructions from a first format into a device-readable format. For example, the compiler 113 may receive instructions in a proprietary videowall language (or, alternatively, a high level programming language (e.g., Java, C#, C, C++, Basic, Fortran, Python, Ruby, etc.) and convert the instructions into a device-readable format such as, but not limited to, binary values, ASCII, or Unicode.

The one or more processors 112 can be any conventional processors, such as a commercially available CPU produced by INTEL, ARM, and AMD. Alternatively, the processors can be dedicated components such as an application specific integrated circuit ("ASIC"), a system on chip ("SOC"), field programmable gate array (FPGA), or other hardware-based processor. The one or more graphics processing units 123 ("GPU") may be any conventional graphics processing units, such as those produced by INTEL, AMD, and NVIDIA.

Although FIG. 1 functionally illustrates the one or more processors 112, memory 114, and other components of the computing devices 120, 130, 140 as being within the same housing, the one or more processors 112, memory 114, and other components can actually comprise multiple processors, memories, and other components that may or may not be stored within the same physical housing. For example, the memory 114 can be a SSD located in housings different from that of the computing devices 120, 130, 140. Accordingly, references to a processor, memory, or other elements will be understood to include references to more than one processors, memories, or other elements that may or may not operate in parallel. For example, the computing device 130 may include server computing devices operating as a load-balanced server farm, distributed system, etc. Moreover, although some functions described below are indicated as taking place on a single computing device, various aspects of the subject matter described herein can be implemented by a plurality of computing devices communicating information over the network 160. Additionally, each computing device 120, 130, 140 can be comprised of more than one computing device. Yet further, each computing device 120, 130, 140 may be the same computing device.

Each of the computing devices 120, 130, 140 can be at different locations (i.e., nodes) of the network 160. Each computing device 120, 130, 140 may communicate directly and/or indirectly with other computing devices and components connected to the network 160. Further, although only a single media transceiver 140, a single user device 120, a single storage device 150, and a single content management system 130 are shown in FIGS. 1 and 2, there may be numerous media transceivers, storage devices, content management systems, and user devices placed locally and/or remotely from each other.

The network 160 and intervening nodes, and devices located on the network 160 can be interconnected using various protocols and systems, such that the network can be part of the Internet, World Wide Web, specific intranets, wide area networks, or local networks. The network can utilize standard communications protocols, such as Fiber Channel Protocol ("FCP"), Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information. In some embodiments the devices may be directly connected or wirelessly connected.

As an example, each of the content management systems 130 may include web servers capable of communicating with storage system 150 as well as user devices 120 and media transceivers 140 via the network 160. For example, one or more of server computing devices 130 may use the network 160 to transmit and present information to a user on a display (e.g., the video wall 180, the display 125 of a user device 120, or the like). In this regard, computing devices 120 and 130 may be considered client user computing device and may perform all or some of the features described herein.

Although the computing devices 120, 130, 140 are illustrated as a full-sized personal computing device and servers in FIG. 1, each computing device 120, 130, 140 may be a personal computing device or a mobile computing device capable of wirelessly exchanging data with a server over a network such as the Internet. By way of example only, the user computing device 120 may be a mobile phone or a device such as a wireless-enabled PDA, a tablet PC, laptop PC, or a netbook that is capable of obtaining information via the Internet. In another example, the user computing device 120 may be a head-mounted computing system or a virtual reality system and/or an augmented reality system. As an example the user may input information using a small keyboard, a keypad, a microphone, using visual signals with a camera, or a touch screen.

The storage device 150 can be of any type of computerized storage capable of storing information accessible by the computing devices 120, 130, 140, such as a SSD, a disk based hard-drive, memory card, ROM, RAM, DVD, CD-ROM, etc. In addition, the storage device 150 may include a distributed storage system where data is stored on a plurality of different storage devices which may be physically located at the same or different geographic locations. The storage device 150 may be connected to the computing devices 120, 130, 140 via the network 160, as shown in FIG. 1, and/or may be directly connected to any of the computing devices, such as the content management system 130 or the media transceiver 140 (not shown).

The storage device 150 may be managed and/or accessed by the content management system 130, the user device 120, and/or the media transceiver 140. For example, a user operating the videowall content control application operating on the content management system 130 may store, delete, edit, and otherwise manipulate content which is stored in the storage device 150. In another example, a user of the user device 120 may store, delete, edit, and otherwise manipulate content which is stored in the storage device 150. For example, the user is able to utilize the ability of the system 100 to synchronize playback on all the displays 181. This is accomplished over the network 160. All the displays 181 must have frame-accurate sync regardless of how many displays 181 are involved and where the displays 181 are placed physically. The media transceivers 140 must have this sync component built into their architecture, and the media transceivers 140 must receive the sync data over the network 160 as generated by the videowall engine. The "sync" signal must be linked to the "timecode" component that is part of the videowall engine and the content control application. Timecode is used in the authoring of the configuration file on the user device 120. The user sets specific events to occur at specific timecodes. Timecodes can run at a variety of standard (23.976, 24, 29.97, 30.59/0.94, 60, 120 frames per second, etc.) or non-standard framerates. The user can also select the source of the timecode, which can be: internal time code generated by the Content Management Device 130; external time code generated by an external device and received via the network 160 or via a timecode input card (timecode may be SMPTE-formatted) frame code which is locked to the number of frames in a particular video file that is being played back on the content management system 130, a media transceiver 140, or another external video playback device.

Timecode is used to make sure that all the components are executing their commands in a compelling manner to accomplish design and usability objectives. Then "sync" is required to make sure that all the frames of video are playing back at exactly the same time. This is critical in videowall programming to assure an uninterrupted visual experience over multiple displays 181. "Sync" can be achieved by using a specific network protocol that links all devices on the network 160. When the user on the user device 120 goes to real-time mode and executes a program, that program may, for example, start an internal clock at 00:00:00:00 timecode. At a specific time, for example, 00:00:01:00 (i.e., one (1) second later), the program calls for an event to take place on the video wall 180. This program has already been distributed to all the media transceivers 140 during the compilation process. Each transceiver 140 then executes its commands. In doing so, each transceiver 140 checks the timing signal on the network time code and executes its commands to match the designated timecode exactly. In sum, time code can come from a multiple of internal or external sources. "Sync" is achieved by using a network protocol that provides a common time base to all devices in the system 100.

As mentioned above, content may include all types of multimedia including, but not limited to, video files, live action recordings, two and/or three dimensional virtual reality content, audio content, 3D objects, etc. Content may be stored and retrieved from the storage device 150 and/or other locations external to the system 100, such as external media server(s), online content databases and websites, streaming services, etc. In some embodiments, the locations external to the system 100 may also provide instructions to the media transceiver 140. For example, the storage device 150 may be managed by integrated third-party AI technology.

The video wall 180 may include one or more individual video displays. For example, the video wall 180 illustrated in FIGS. 1 and 2 may include one or more of a high resolution light emitting diode ("LED") display, organic light emitting diode display ("OLED), Quantum Dot display, Laser Projection, LCD screens (including, but not limited to Transparent LCD or OLED), stereoscopic LED or LCD, Autostereoscopic display, projector, and/or immersive multi-projector systems. Each video display may be capable of displaying both two-dimensional ("2D") content and three-dimensional stereoscopic and/or auto-stereoscopic content.

Figure 3:
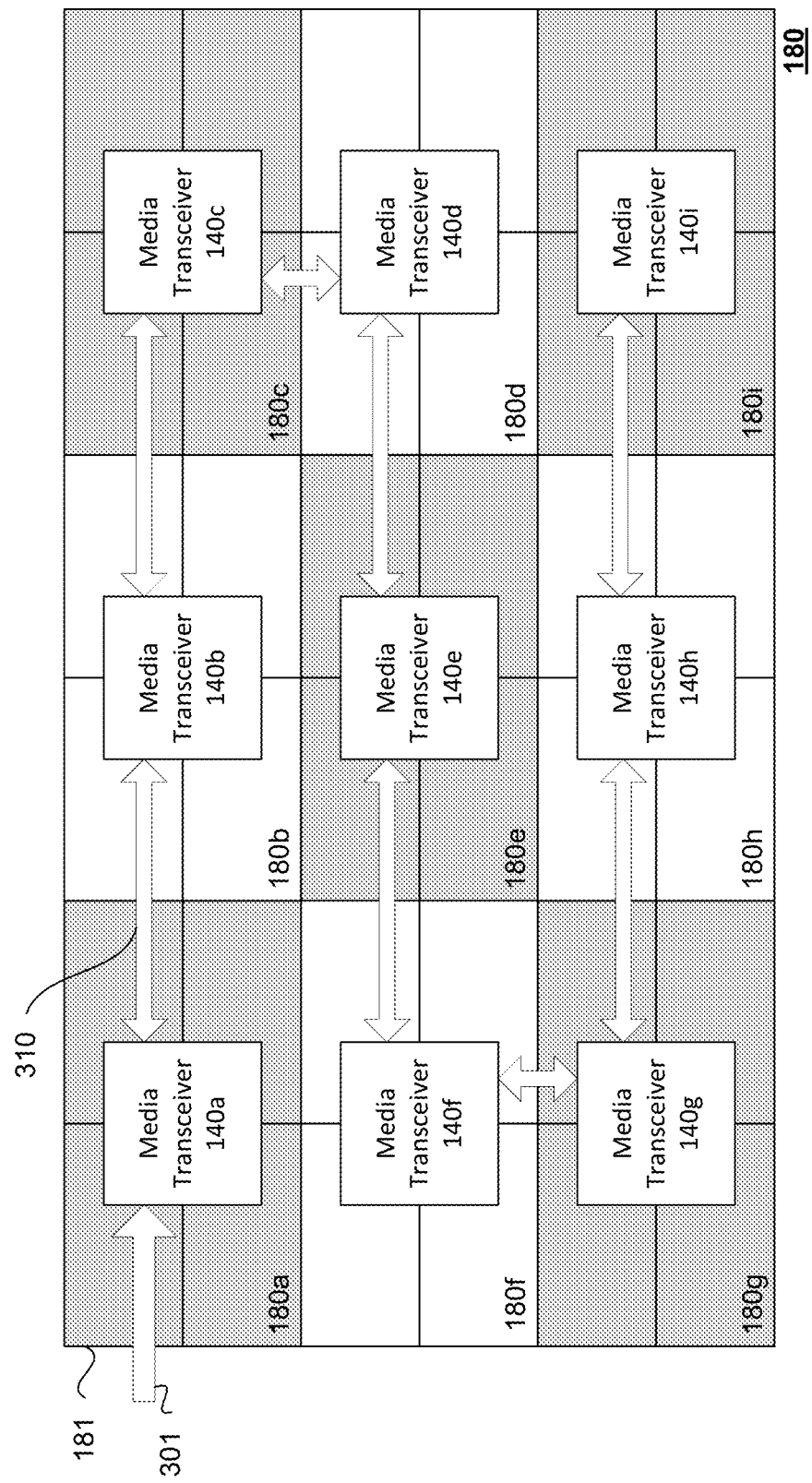
FIG. 3 illustrates a video wall and media transceivers according to aspects of the disclosure.

As seen in FIG. 3, the video wall may include a number of individual displays 181. Each individual display 181 may be of any resolution, such as 720p, 1080i, 1080p, 4 k, etc. For instance, the individual displays 181 of FIG. 3 may have a 1080p resolution (i.e., a 1920×1080 resolution,) and may be arranged to create the video wall 180, such as by being arranged in six (6) rows of six (6) individual displays 180, for a total of thirty six (36) individual displays 181, as further shown in FIG. 3. The total resolution of the video wall 180 may be 11,520×6,480 (i.e., 12K×6K).

The individual displays may be grouped into display groups. For example, as shown in FIG. 3, the video wall 180 may include nine (9) display groups 180a-180i with each display group including four (4) individual displays 181; providing a video wall 180 having thirty six (36) individual displays 181. Although the display groups each include four (4) individual displays 181, any number of individual displays may be included in a display group. There is one server 130 running a videowall engine, with nine (9) media players (or media transceivers) 140a-140i in communication with the videowall engine. Each media transceiver 140a-140i runs an instance of a content control application. The source materials can be delivered over a network from a variety of sources or content can be stored locally on the media transceivers 140a-140i for access. The media transceivers 140a-140i can run autonomously or under network control. The media transceivers 140a-140i can operate using live inputs in real-time. The system is highly scalable due to its distributed processing architecture.

Although the arrangement of the displays results in a rectangular video wall, as shown in FIG. 3, the display groups and/or individual displays may be arranged in any configuration and orientation. In this regard, each display group or individual display may be independently rotated, placed, and otherwise positioned and directed in any location relative to the other displays and/or display groups. For example, the displays of display group 180a may be positioned in a portrait orientation and positioned apart from the other display groups 180b-180i. In another example, one or more display groups may be positioned in a variety of configurations including, but not limited to, where displays groups are alternated between portrait and landscape orientations, where display groups comprising differing numbers of individual displays can be arranged side-by-side horizontally, stacked vertically, and/or both in various combinations and permutations. For example, the display groups can be arranged so as to give the video wall 180 the general appearance of various shapes including, but not limited to, a pyramid, a triangle, a square, a rectangle, a diamond (e.g., offset, symmetrical, or the like), circular, heart-shaped, oval, symmetrical, asymmetrical, or the like. The number of individual displays 181 forming the video wall 180 is limited only by the constraints of the physical space where the video wall 180 is located. For example, the video wall 180 can comprise a single display 180 or a plurality of displays (e.g., ten (10) displays, dozens of displays, over a hundred (100) displays, etc.). A video wall 180 is not limited to horizontal and vertical configurations in a single plane, but can also be arranged in a multi-plane configuration so that the video wall 180 is "three dimensional" in a multi-sided configuration. The video wall 180 can be arranged on any surface and it is possible to create an entire room where floor, ceiling, and walls include displays 181 forming a part of one or more video walls 180.

The individual displays 181 may be linked together to receive the content through one or more connectors. For example, each individual display 181 may receive content through a direct digital or analog connection with the one or more media transceiver 140 assigned to that individual display 181 via HDMI, digital video interface ("DVI"), DisplayPort, serial digital interface ("SDI"), high definition SDI ("HD-SDI"), etc. In some embodiments the individual displays 181 may receive the content wirelessly from a media transceiver 140. Further, the individual displays 181 may all be daisy chained together or individual displays in a display group may be daisy changed together. For instance, each of the four individual displays 181 in display group 180a may be daisy chained together. As such, content received by one individual display 181 of a particular display group may be passed through to the other individual displays 181 of that particular display group.

Media transceiver 140 may distribute the content to the displays 181 on the video wall 180. In this regard, referring back to FIGS. 1 and 2, the media transceiver 140 may be configured to run a content control application. The content control application may be compatible with a range of different third-party media players (or media transceivers) 140. The content control application may control the playback of content on the video wall 180 based on the instructions received from the content management system 130 or other systems such as other media transceivers 140 via an input connection 301, as shown in FIG. 3. The content control application may be operated through a graphical interface or may be text based. In this regard, the content control application may be configured to read and execute the received instructions in a proprietary language or in another language, such as C, C+, Python, etc.

The content control application may control the playback of content on the video wall 180 in real-time. For example, the media transceiver 140 may receive instructions and content via input connector 124. Upon receiving the instructions and content, the content control application may decode the instructions and content, and execute the instructions and output the content to the video wall 180 and/or audio system 250, or perform some other function such as additional processing of the content prior to outputting the content to the video wall 180.

Input 124 may be configured to accept one or more types of connectors such as an optical fiber connector, an Ethernet connector, or other such connector. Input 124 is for video input. While video may be transmitted to the media transceiver 140 over the network 160, "live" video from cameras, Internet or other feeds may enter the media transceiver 140 via input 124 via one or more types of connectors such as HDMI, DisplayPort, SDI, HD-SDI, DVI, VGA, etc. The output 128 may be configured to accept one or more types of connectors such as such as HDMI, DisplayPort, SDI, HD-SDI, DVI, VGA, fiber optical connector, or the like, and may be connected with the displays 181 of the video wall 180 and/or the audio system 250. In some embodiments audio may be output from the media transceiver 140 to the audio system 250 through connections such as HDMI, SPDIF, optical, RCA, USB, etc. In some embodiments the media transceiver 140 may be a third-party media streaming and/or playback device, such as Roku®, Amazon Fire®, PlayStation®, X-Box®, digital signage players (e.g., digital signage players from third-party suppliers such as Brightsign, Intel and entertainment-oriented media servers from companies such as Chritie Digital, Green-Hippo and 7th Sense), etc.

The one or more media transceivers 140 may store the content and/or instructions locally. In this regard, one or more of the media transceivers may download the content and instructions from the content management system 130 and/or storage device 150 over the network when the media transceiver 140 is not outputting content (i.e., when the media transceiver 140 is not in use), and/or as a background task when the media transceiver 140 is outputting content (i.e., when the media transceiver 140 is in use). The content and instructions may be transferred to the one or more media transceivers 140 via physical hardware, such as via a USB drive. By storing the content and instructions locally, the media transceiver may output the content to the video wall 180 when the one or more media transceivers 140 are not connected to the network 160 or when the one or more media transceivers 140 have a poor connection to the network 160 or when the use of the videowall content control application is not wanted and/or needed for playback of the content.

Multiple media transceivers 140 may be connected together. For example, media transceivers 140a-140i, as shown in FIG. 3, may be connected together wireless or via a direct connection, such as connection 310. Connection 310 may be an Ethernet connection, optical fiber connection, USB connection, HDMI connection, or other such connection capable of carrying content and instructions. The connection 310 may allow media transceivers 140 to pass through instructions and content received from the content management system 130 and/or storage device 150. As such, only one media transceiver, such as media transceiver 140a may receive the instructions and content from the content management system 130, or other content source, and store the instructions and content locally. Media transceiver 140a may then pass the instructions and content to the other media transceivers such as to media transceiver 140b through the connection 310. Media transceiver 140b may in turn pass the instructions and content to media transceiver 140c and so forth until all of the media transceivers have received the instructions and content. Alternatively, the media transceivers 140a-140i may be interconnected such that non-adjacent media transceivers (e.g., transceiver 140a and transceiver 140e, transceiver 140c and transceiver 140i, etc.) may directly communicate with each other (e.g., via wired or wireless connection).

Each media transceiver 140 may be assigned and connected to one or more individual displays 181 and/or display groups, such as display groups 180a-180i. In this regard, each media transceiver 140a-140i may be assigned and connected to a respective display group 180a-180i. Based on the received instructions, each media transceiver 140a-140i may control the playback of content on its respective individual display 181 or display group 180a-180i. For example, for each media transceiver 140, the received instructions may provide the content control application with instructions on which content should be displayed on the individual display 181 or display group 180a-180i associated with and connected to that respective media transceiver 140.

The content management system 130 may execute a videowall control application which may be used to create the instructions used by the media transceivers 140a-140i. In this regard, the videowall control application may allow a user, such as user 210, to generate a configuration file. In one example, a user, such as user 210, may access the content management system 130 via a network connection between the content management system 130 and a user computing device, such as computing device 120 and the videowall content control application may be presented to the user 210 on the display 125. In some embodiments, the user 210 may access the videowall content control application directly from the content management system 130. The videowall content control application may be operated through a graphical interface or may be text-based. In this regard, the videowall content control application may generate the configuration file in a proprietary language or in another language, such as C, C+, Python, etc. In some embodiments the videowall content control application may execute on another device, such as the user device 120.

One or more compilers 113 may compile the configuration file into a format readable by one or more processors 112. In this regard, the videowall content control application may pass the configuration file to a compiler, such as the compiler 113, which may compile the configuration file into instructions readable by the one or more processors 112.

Based on the instructions received from the compiler 113, the one or more processors 112 may perform operations. Such operations may include passing instructions and/or content to one or more media transceivers 140 or passing instructions to the videowall engine. The videowall engine serves as authoring platform, controller, and master media server. In some embodiments, changes made to the configuration file may be passed to the compiler 113, and subsequently to the one or more processors 112 in real-time.

The videowall content control application may include the videowall engine which, in turn, may control CPU 112 and GPU 123 processing of pixel data within the content to dynamically map individual pixels to a video wall 180. In this regard, for example, the videowall engine may integrate with one or more real-time three-dimensional or two-dimensional gaming engines, such as the Unreal Engine. The videowall engine may execute on one or more GPUs 123 and/or one or more CPUs 112.

The videowall engine may generate, splitting work between the one or more CPU 112 and the one or more GPU 123, a programmable pixel space onto which the pixels of the content may be written. In an embodiment, a programmable pixel space is created in a graphics memory of the videowall engine. The pixel space can be any size (e.g., resolution) and shape (e.g., aspect ratio) as specified in the configuration file. In this regard, the pixel space may be a database in which individual pixel data for each pixel in one or more frames of the content may be stored relative to the other pixels in the data. To illustrate the operation of the pixel space 400, the pixel space 400 is represented as a virtual rear projection screen 412 split into three levels 401, 403, and 405, as further shown in FIGS. 4A-4C. The pixel space 400 may include an input level 401, a processing level 403, and an output level 405. For example, in the processing level 403, pixels from the input level 401 are read, processed in real-time, and then written onto the output level 405 for display. The processing level 403 may be created using the GPU 123 of a display card on the server 130. Each level 401, 403, and 405 may be a representation of different databases in which individual pixel data for each pixel in the content may be stored relative to the other pixels in the data. In some embodiments, each level 401, 403, 405 may be contained in the same database. The pixel space 400 may be stored within the GPU's memory and/or in another storage location. In some embodiments the pixel space may be generated within one or more processors.

As previously stated, the pixel space 400 may be generated in any size and shape (e.g., resolution and aspect ratio.) In this regard, the size and shape of the pixel space 400 may be controlled by instructions input into the configuration file. Changes to the pixel size and shape may be pre-programmed or may occur in real-time based on inputs from the configuration file. For example, during the processing of the content by the videowall engine, a user, such as user 210, may input additional data into the configuration file which may cause the pixel space to switch, dynamically, from 4K at the start of the content to 1080p during a particular portion of the content, and back to 4K after the particular portion.

Figure 4A:
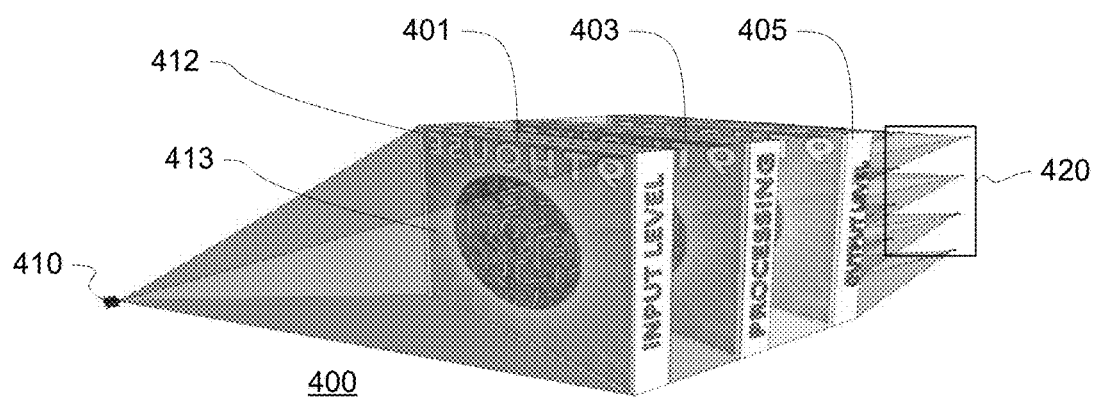
FIGS. 4A-4C illustrates pixel mapping according to aspects of the disclosure.
Figure 4B:
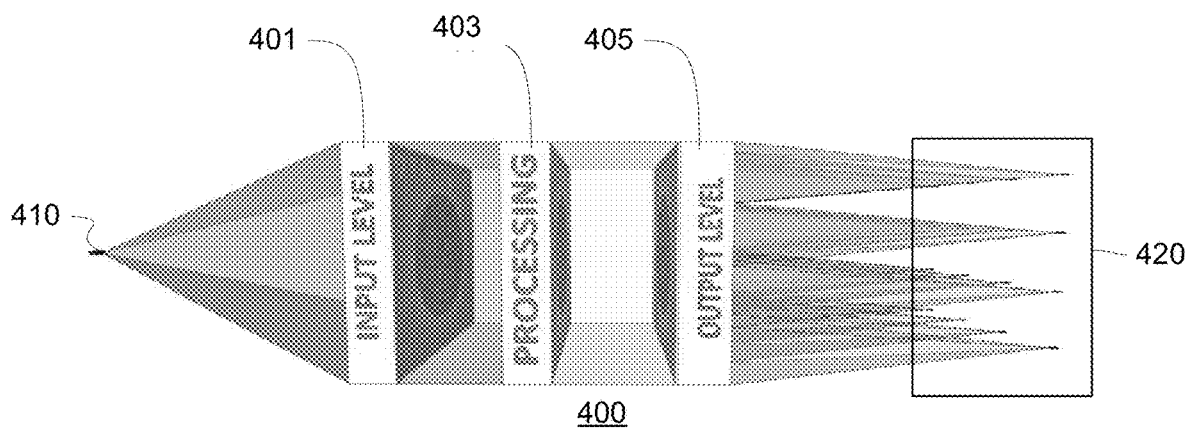
Figure 4C:
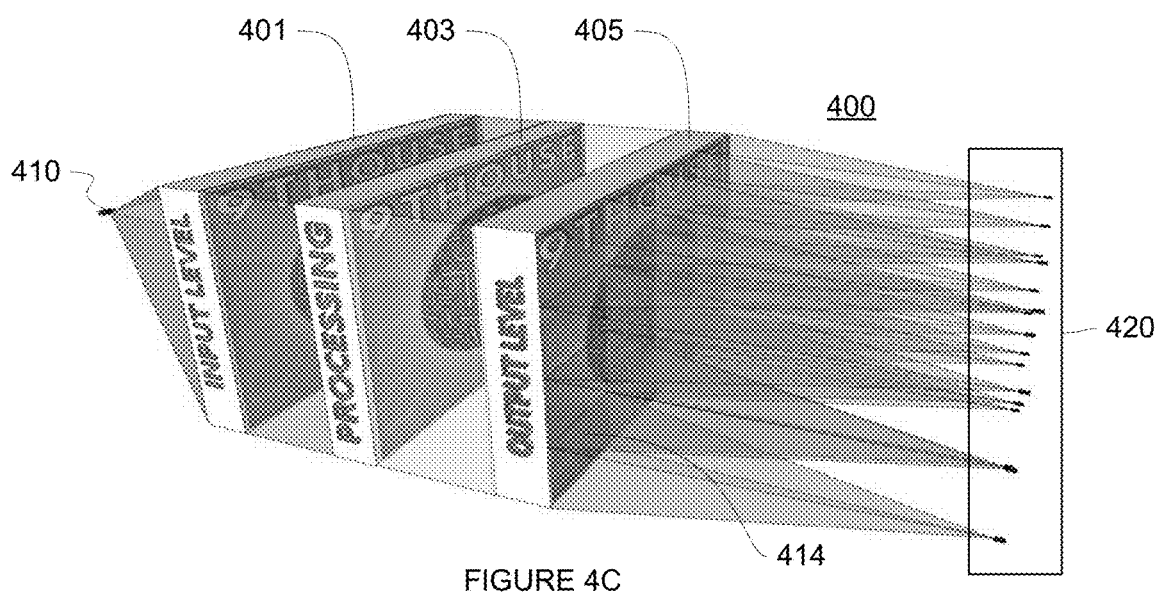

The videowall engine may project the content derived from inputs of external pixel data or from pixel data created from internal image generators onto the rear of the virtual rear projection screen 413 via one or more virtual projectors 410. For example, as shown in FIGS. 4A-4C, virtual projector 410 projects content onto the rear of the virtual rear rejection screen 413 (i.e., the videowall engine is writing the individual pixel data of the content to the input layer 401). For example, source materials and specific content inputs are assigned to virtual projectors 410 which write pixel data on the pixel input level 401 of the pixel space 400.

The content projected onto the rear of the virtual rear projection screen 413 by the virtual projectors 410 may be defined by the configuration file. In this regard, more than one source of content may be projected onto the rear of the virtual rear projection screen 413. For example, each content may be assigned to a respective virtual projector 410 or each content may be split between virtual projectors 410 for projection onto different areas of the virtual rear projection screen 412.

The individual pixel data of the content may be passed from the input level 401 to the processing level 403 for processing. Processing may occur in real-time and may include manipulating at least some, none, or all of the individual pixel data. For example, effects (e.g., color shifting, fading, tinting, washing, etc.) may be applied to the individual pixel data. The individual pixel data may be output from the processing level 403 to the output level 405, as further shown in FIGS. 4A-4C.

Although all portions of the pixel space 400 are shown as containing pixel data, one or more portions of the pixel space 400 may not contain any pixel data. In some embodiments, the content may contain more pixels than there are pixels in the pixel space, or the content may contain fewer pixels than there are individual pixel data in the pixel space. The videowall engine may downscale or upscale the content to fit the size and shape of the pixel space, or leave portions of the content out of the pixel space, or leave portions of the pixel space blank.

The videowall engine may generate a virtual camera for each individual display 181 in the video wall 180 or for one or more groups of displays 180a-180i in the video wall 180. For example, as shown in FIGS. 4A-4C, multiple virtual cameras 420 may be generated for each respective display group 180a-180i, as shown in FIG. 3. In this regard, the configuration file may define the number of virtual cameras 420, the portion of the pixel space which the virtual camera(s) 420 will capture, and the association of the virtual camera(s) 420 to a display group 180a-180i or individual display 181. For instance, the configuration file may provide instructions that the virtual cameras 420 may be positioned to capture portions of the pixel space from a front of the virtual rear projection screen 414. The configuration may also allow for the position of one or more virtual cameras 420 be moved, independently of the other virtual cameras 420 during the performance of the content. The configuration file may also allow one or more of the virtual cameras 420 to be turned on and off during a performance. Each virtual camera 420 may capture their assigned pixel space through a virtual lens, such as a flat lens, fish lens, or any other type of lens. The virtual lenses may include filter effects. The virtual cameras 420 have a variety of virtual lenses and filters that will affect how the content appears on the displays 180.

Virtual cameras 420 serve as "outputs." That is, individual transceivers 140 running the videowall content control application can link to specific virtual cameras 420 and "see" the output level 405 of the pixel space 400 through the virtual lens on the virtual camera 420. Each transceiver 140 is running the videowall control application, and receives instructions that specify which virtual camera 420 it should access to acquire and display pixel data. The control application allows the transceivers 140 to also add local processing to the pixels and execute basic functions (e.g., RUN/FREEZE, SCALE, COLORIZE, etc.). The videowall content control application manages the frame-locked synchronization of the multiple transceivers 140.

Media sources for 2D/3D include, without limitation, external media server(s), online resources, streaming media, Virtual Reality (VR)/Augmented Reality (AR) environments, or the like.

In some embodiments the videowall engine may generate three-dimensional content for display on a video wall 180. To achieve a stereoscopic output using the videowall engine described above, two (2) separate pixel spaces 400 are set up—a pixel space 400 for the left eye and a pixel space 400 for the right eye. Output processing depends on the 3D format required by the on-board processor on the display (e.g., Side-by-Side, Top-Bottom, Interlaced, etc.) or the capabilities of the individual media transceiver 140 that attached to a particular display 181. In order to provide a stereoscopic output, a warping engine is needed to allow the user (e.g., a programmer) to place the 3D imagery along a z-axis—either in front, on, or behind the screen surface. This positioning can be changed dynamically.

Furthermore, in some embodiments the videowall engine may generate autostereoscopic content (i.e., three-dimensional content that includes binocular perception of 3D depth without the use of special headgear or glasses on the part of the viewer) for display on a video wall (sometimes referred to as "glasses-free 3D" or "glassesless 3D"). There are two broad approaches currently used to accommodate motion parallax and wider viewing angles: eye-tracking, and multiple views so that the display does not need to sense where the viewers' eyes are located. The integration of the system 100 with augmented reality (AR) software can provide a glasses-free AR experience. In an illustrative embodiment, to achieve autostereoscopic output using the videowall engine described above, cameras and various sensors would activate different types of layered content to achieve AR effects displayed on the videowall. Autostereoscopic 3D (AS3D) is a format of video. For example, nine (9) different views or images of the same scene can be taken, each view allocated to a different area of the internal pixel space 400 of the videowall engine, and then pixels from each of the nine (9) images sampled to create a composite image that is sent to the media transceivers 140 for display. The media transceivers 140 must be driving an AS3D display device with optics calibrated to match the sampling of the pixels so that the pixels from each of the nine (9) images are optically spatially separated to accurately re-create the stereoscopic image by sending different images to the left and right eyes. An AR application requires additional content and servers to create the experience. Information from a variety of cameras and sensors is processed either on an external device or internally by the one or more processors 112, and the resulting processed video is mapped into a virtual pixel layer in the videowall engine (see FIG. 4A). The videowall engine can then be programmed to display the AR content on the video wall 180—with appropriate blending, keying and overlays, and dynamically adjust the content according to the interactive data generated by the sensors.

The virtual cameras 420 may each correspond to one or more individual displays 181 or groups of displays 180a-180i, as defined in the instructions of the configuration file. Moreover, the content each virtual camera 420 captured may be transmitted to their respective one or more individual displays 181 or groups of displays 180a-180i. For example, a video wall 180 may include four (4) individual displays grouped in a 2×2 grid. The videowall engine may generate four (4) virtual cameras 420, with each virtual camera 420 being associated with a different display 181. Based on received instructions, each of the four (4) virtual cameras 420 may provide a portion of content for display on its associated display 181. Each virtual camera 420 may generate mapping information corresponding to how the respective portions of content were mapped to their associated display 181. The mapping information, content, and instructions may be transmitted from the content management system 130 to one or more media transceivers 140 based on the instructions.

In some embodiments one or more of the levels 401, 403, 405 may be combined into a single level. For example, the content projected onto the rear 413 of the virtual rear projection screen 412 may be output directly to the virtual cameras 420 without passing to additional layers for further processing.

As previously discussed, the user device 120 may enable a user, such as user 210 to access the videowall content control application to generate a configuration file. In this regard, the user device 120 may execute a videowall access application which allows a user to access the videowall content control application on the content management system 130. In this regard, the user device 120 may present an interface, such as the videowall content control application's graphical user interface and/or text interface (i.e., command line) through which the user may adjust, create, delete, or otherwise manipulate a configuration file. Whatever the type of interface used, the system 100 includes a fluid interface that allows content creators to make changes to the display system (e.g., what is being presented on the display) in real-time. This fluid interface encourages creative risk taking and increases the likelihood that more effective engagement with viewers will be achieved. The fluid interface also creates the possibility of information feedback loops and the more effective organization of materials both for information management and creative/artistic objectives. The software functions and the hardware functionality of the fluid interface enables the user to manage large amounts of visual information in a very efficient manner regardless of the number and scale of screens or the types of content involved.

The videowall access application may enable the user to provide real-time controls to the content management system 130 and/or media transceivers 140. In this regard, the user may provide the content management system 130 and/or media transceiver(s) 140 with instructions such as when to start and stop content playback on the video wall 180, when to switch content, etc.

One or more interactive devices 126 may also be connected to the content management system 130. The data captured by the interactive device 126 may allow a user to control and/or interact with the content being displayed on the video wall 180. Although the interactive device 126 is shown as being connected to network 160, the interactive device 126 may be connected directly to the content management system 130, user device 120, and/or media transceiver 140. The interactive device 126 may include a camera, motion sensor, touch screen, microphone or other such device. Furthermore, as discussed elsewhere, the system 100 can be driven by AI systems, using AI to both search and acquire visual assets, and then to display them in the most effective way possible according to dynamically changing criteria. For example, as a user interacts with the system 100 and discovers new information, their search objectives may change due to the information the user discovers, and the user would therefore re-direct their search criteria/objectives. Likewise, an AI system may be instructed to use high level analysis to suggest possible search criteria or resources to the user, also possibly resulting in the dynamic changing of the search objectives as discoveries are made. AI can also execute complex processing techniques that allow greater throughput of imagery over a given network bandwidth without a corresponding loss of perceived resolution. Interaction with an AI Operator provides the ability to control the system 100 without complex training. AI can be used to overcome language and cultural barriers. AI can also use predictive analysis to maintain systems 100 in peak operating condition, in accordance with parameters defined within the system 100. Another benefit is that AI can maintain networks of video walls 180 regardless of complexity and scale. AI can be used to create content for a variety of applications including, but not limited to Public Relations, Marketing, Training, Education, Entertainment, and Art.

Example Methods

A user of a computing device, such as user device 120, may access a videowall content control application executing on a computing device, such as content management system 130. In this regard, upon the user navigating to the videowall content control application, such as through a web browser or a locally stored program, the content management system 130 may provide, for display on the user computing device 120, an interface for generating, editing, and/or deleting a configuration file.

The configuration file may include instructions which control the content which is displayed on a video wall 180. In this regard, through the videowall content control application, the user may provide, delete, and/or otherwise manipulate input information within one or more configuration files. The input information may include one or more of the non-exhaustive list of input information found in Table 1, below.

TABLE 1

Input Information

1. Number of individual displays.
2. Resolution of the individual displays.
3. A pixel map.
4. Location of the individual displays relative to at least one other individual display.
5. The display group(s) (i.e., the individual displays grouped together).
6. Location of the display groups relative to at least one other display group.
7. The location of media transceiver(s) associated with display group(s) and/or individual display(s).
8. The association of media transceiver(s) with display group(s) and/or individual display(s).
9. Content for display (video and audio).
10. Location of the content.
11. Where the content is to be displayed on the video wall.
12. Playback speed and direction.
13. Playback start time/end time.
14. Pause timing and pause length.
15. Playback timing (e.g., timecode information and/or frame-locked synchronization information)
16. Effects (e.g., tints, washes, etc.)
17. Control Files (i.e., a file which can be read by the videowall control application and which includes one or more of the input information)
18. Information regarding general playback and display of content on a video wall or display.
19. External systems (e.g., AI, AR, etc.) delivering content and instructions as input information.

Figure 5:
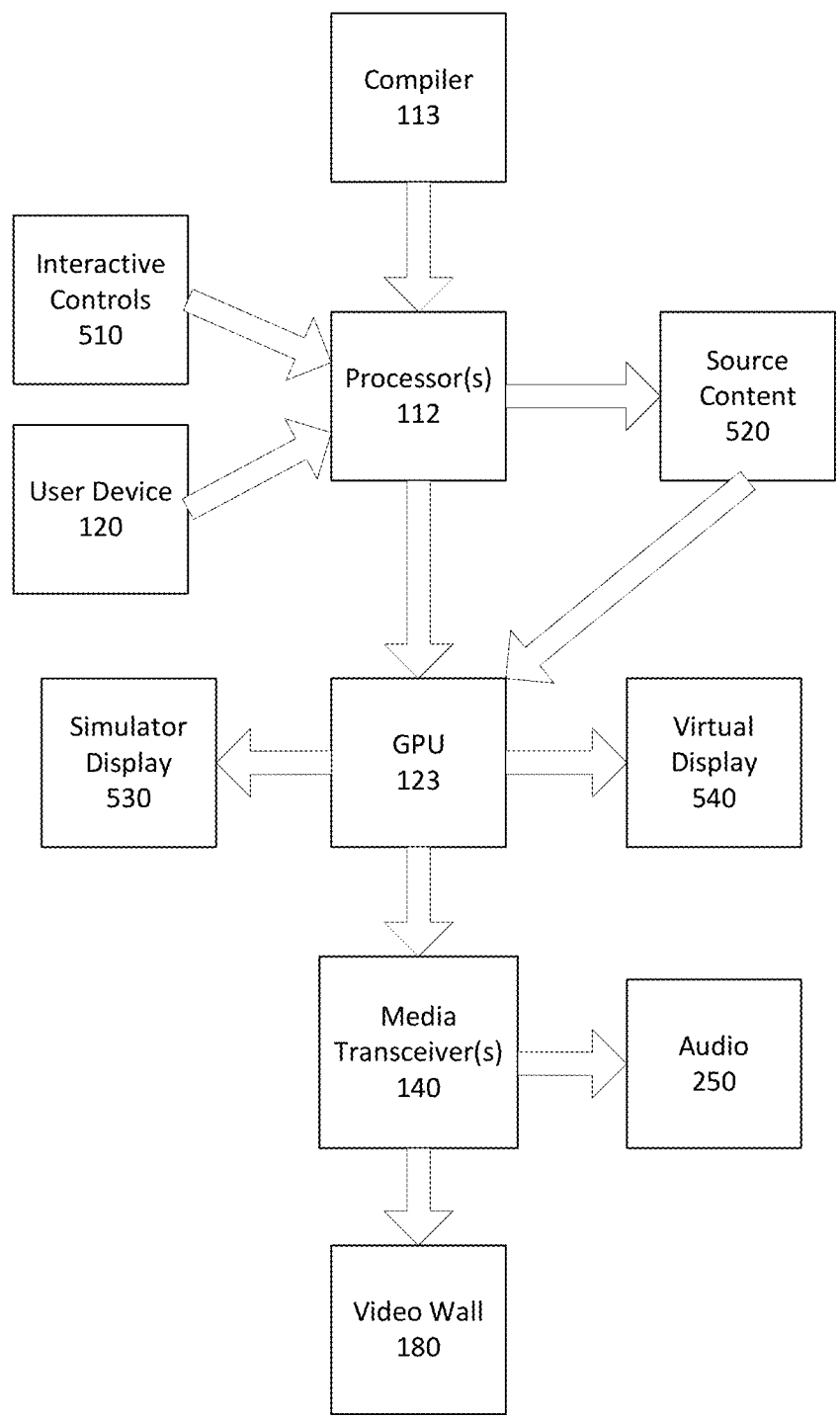
FIG. 5 illustrates a flow diagram of controlling, mapping, and displaying content in accordance with aspects of the disclosure.

As shown in FIG. 5, upon receiving a configuration file and instructions to execute the configuration file, the videowall content control application may pass the configuration file into a compiler 113 which may then compile the configuration file into machine readable language instructions and data which are executable and/or readable by the one or more processors 112. The compiler 113 may then pass the instructions and data to the one or more processors 112.

Figure 6A:
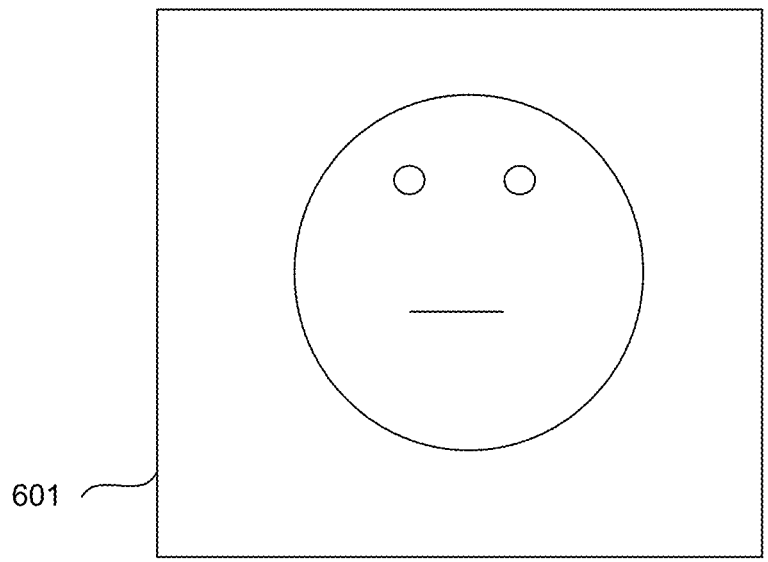
FIGS. 6A-6D illustrates displaying content on a video wall according to aspects of the disclosure.
Figure 6B:
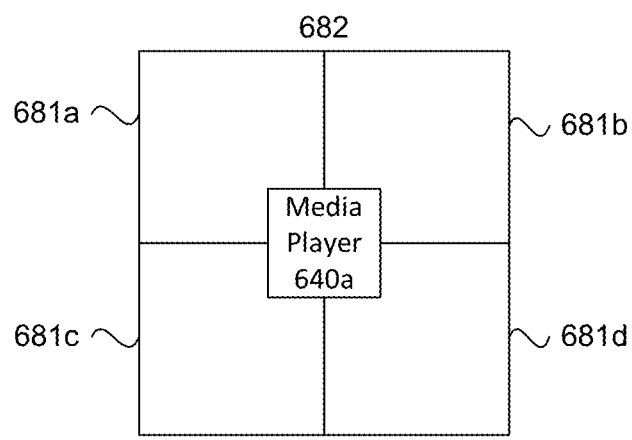

Based on the compiled instructions, a videowall engine may control the processing and/or co-processing of the instructions and/or the content on the GPU 123 and CPU 112. In this regard, the instructions may provide the videowall engine with the input information and further instructions on how the content is to be mapped to a video wall 180. For example, referring to FIG. 6A, the one or more processors 112 may pass 1080p resolution content 601 to the videowall engine. The one or more processors 112 may also pass input information indicating that there are four (4) individual displays 681a-681a, with 1080p resolution, which are grouped together 682 and associated with media transceiver 640a, as shown in FIG. 6B. In some embodiments, interactive controls 510 and/or the user device 120 may cause the one or more processors 112 to instruct the videowall engine to perform additional functions, such as stop or starting playback, or process and map real-time video to a video wall 180, as further shown in FIG. 5.

The content may be retrieved from a collection of source content 520 (e.g., live or stored content, such as content found on storage device 150), as further shown in FIG. 5, or the content may be generated internally by the computing device 120 or another computing device.

Figure 6C:
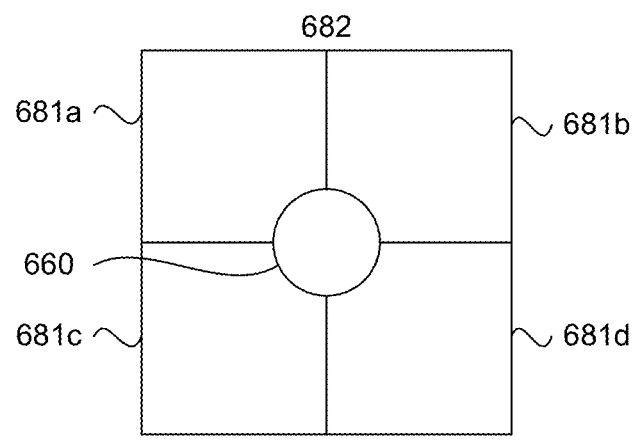

Based on the received input information, videowall engine may map the content to particular locations on particular displays 681a-681d through the use of the pixel map, as described herein. In this regard, based on the configuration file, the videowall engine may generate a virtual camera 660 for each individual display 681a-681d in the video wall or for groups of displays 682 in the video wall. Continuing the above example, a single virtual camera 660 may be generated for the group of displays 682, as shown in FIG. 6C. Although only four (4) individual displays, one media player (or transceiver) 640a, and one virtual camera 660 are shown in FIGS. 6A-6D, any number of individual displays, media transceivers, and/or virtual cameras may be used allowing for the ability to scale the system 100 to a user's needs. Further, the number of displays, media transceivers, and/or virtual cameras may be changed in real-time.

The content 601 may be scaled and mapped to the individual displays 681a-681d of the group of displays 682 through the virtual camera 660 by the videowall engine. In this regard, the videowall engine may process the content in real-time. For instance, the videowall engine may receive the 1080p content 601 and upscale and/or downscale the content 601 to fit the collective resolution of the displays 681a-681d. In one example, the videowall engine may upscale the 1080p content four (4) times to fill the resolution of the four (4) individual displays 681a-681d which belong to the display group 682.

Figure 6D:
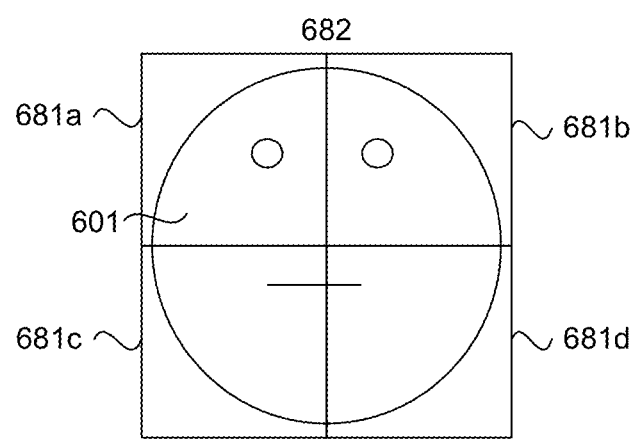

The videowall engine may then map the pixels of the scaled content to respective pixels of the individual displays 681a-681d based on the location of the virtual camera 660. For example, as shown in FIG. 6D, the up-scaled content may be separated into four (4) parts corresponding to each of the individual displays 681a-681d from the perspective of the virtual camera 660. The videowall engine may then map the scaled content to each respective display 681a-681d, as further shown in FIG. 6D. Although the virtual camera 660 is shown as centered on the group of displays 682, based on the instructions received from the one or more processors 112, the virtual camera 660 may be located off-center.

Upon mapping the content, the videowall content control application may then transmit the mapped content associated to the one or more media transceivers 140 associated with the video wall 180. For example, the scaled content 601 may be transmitted to media transceiver 640a, which is associated with display group 682. The media transceiver 640a may receive the transmitted content and output it for display on the video wall, as shown in FIG. 6D.

The transmitted content may be synchronized in accordance with a timing signal. In this regard, the instructions received by the media transceivers 140 may include timing signals which may provide frame-lock synchronization of the media transceivers 140 to allow content to be synchronized on the displays 181 of the video wall 180. The timing signals may be transmitted within a network timing protocol over the network 160 or over another timing protocol. The timing signals may synchronize the content output by the media transceivers 140 to the displays 181 with a tolerance of 0.0001 of a second.

In some embodiments, user may control the content and timing of the content through the use of a timeline. The videowall content control application may provide a timeline interface where a user may program and control the authoring and playback of content based on the contents placement on the timeline. By way of example only, a user may generate content by placing a first piece of content at the start of the timeline and a second piece of content at the point on the timeline where first piece of content ends. Although only two pieces of content are used in the example, any number of pieces of content may be used and further, content may overlap on the timeline. Timing signals may be programmed into the content based upon the placement of the pieces of content on the timeline. By allowing the user to control the placement of the portions of content on the timeline, the user may generate content that tells a story, presents information, etc.

As previously discussed, the videowall content control application of the media transceiver(s) 140 may provide local processing. For instance, each content control application executing on the media transceivers 140 may independently, or in cooperation with other content control applications, adjust where the content is to be displayed on the video wall 180, adjust the playback speed, adjust the direction of playback, stop, pause, or start playback, and add or remove effects to the content. The local processing performed by each respective transceiver 140 may occur only on the pixel data to be output by the respective transceiver 140. In some embodiments one content control application may locally process all of the pixel data.

Referring again to FIG. 5, the videowall content control application may generate simulated displays 530 and virtual displays 540. In this regard, a simulated display 530 uses the videowall content control application to generate virtual sub-displays within a single physical display, such as display 180. For instance, the videowall engine may generate multiple virtual cameras for respective portions of a single display. The videowall engine may then map the content through the multiple virtual cameras onto the respective portions of the single display. As such, a simulated display 530 allows a single physical display to appear as a video wall 180. Although the example provided generates simulated displays within a single physical display, the videowall content control application may generate any number of sub-displays within any number of physical displays.

A virtual display 540 exists entirely in virtual space, such as on a website, gaming site, immersive environment, virtual reality environment, augmented reality environment, or any other virtual setting. In this regard, instead of the videowall content control application outputting content to a display, the videowall control application may output to a virtual space. For instance, the videowall engine may generate one or more virtual cameras associated with a virtual space, and map content to that virtual space through the one or more virtual cameras. As such, virtual video walls may be generated within a virtual environment. Such virtual video walls may be interactive within the virtual space. In this regard, users may access and interact with information, transactions, entertainment and other such content, on the virtual video wall similarly to the way that a user may access and interact with a physical video wall in physical space.

Integrated Technologies

The videowall platform described above is structured in a modular, open format so that other technology components, in the form of one or more external information acquisition and management systems (or external systems) 128 can be fully integrated. In each of these instances, these technologies expand the capabilities of the video wall 180 to provide enhanced delivery of visual information to multi-screen/multi-image systems. These external information acquisition and management systems 128 are discussed in more detail below.

Artificial Intelligence, for example, is an external system 128 that can be used in conjunction with video walls 180 for Search and Display. That is, AI can be used to first determine the best sources of visual data required for a specific installation/task. Then AI can be used to acquire that visual data from massive data storage centers, global networks, other facilities, or the like. AI can also be used to present data in its most useful form on the video wall display system according to dynamically changing criteria, such as search criteria that change instantly upon the discovery of previously unknown information, such changes being directed by the user or by integrated self-directed AI systems, increasing the value of the information. AI can also be used to process visual data to increase apparent resolution and improve image quality while lowering bandwidth requirements. AI can also be used to distribute visual information to remote locations on local and wide networks in the most efficient and effective manner possible. The network transmission includes all of the imagery to fill the video wall display as well as the instruction set that controls how each remote location processes and displays the information. AI would be used to access and present information in the most useful ways possible and according to dynamically changing criteria for specific applications.

Cloud systems, in another example, is an external system 128 that can be used in conjunction with video walls 180. Video wall systems 100 can be constructed so that the bulk of the most demanding image processing tasks takes place in the Cloud. A Cloud-based video wall system 100 would take advantage of distributed processing techniques to enable videowall programming using the lowest possible bandwidth. Cloud-based processing would reduce the cost and potentially increase the capabilities of individual video wall installations. Cloud-based systems 100 could be managed more efficiently from a central location. Cloud-based systems could also be deployed and scaled quickly and cost-effectively.

Big Data is another example of an external system 128 that can be used in conjunction with video walls 180. Video wall systems can provide an efficient and effective tool for accessing, processing and presenting extremely large data sets that may be analyzed computationally to reveal patterns, trends, and associations, especially relating to human behavior and interactions. Use of the video wall system in conjunction with Big Data can provide users with a more powerful tool to find connections and important links between different data elements.

The Internet of Things (IOT) is yet another example of an external system 128 that can be integrated with a video wall 180 to play a role. The IOT is the network of physical devices, vehicles, home appliances, and other items embedded with electronics, software, sensors, actuators, and network connectivity which enable these objects to connect and exchange data. Video wall installations can be used to monitor, program, control, emulate or otherwise interact with other devices and systems on the IOT. For example, a video wall system 100 that is part of a security monitoring system for a large office building could tap into the IOT enabled thermostats in each office and monitor/control heating and cooling.

Gaming is another particular example where video walls 180 can play a role. A video wall gaming system is an external system 128 that could revolutionize the gaming experience and move it from the living room to purpose-built video wall immersive entertainment and gaming centers. A video wall 180 can present gaming experiences using mega resolution in immersive configurations so that groups of players can play together without wearing glasses or head-mounted displays (HMDs). The multi-screen format of a gaming video wall 180 can be used to display options/menus and other non-play interface information in unique ways that facilitate quick selection and more efficient gameplay. Video wall systems can allow remote groups from around the globe to play within the same virtual space, and to switch between "public" and "private" spaces on the video wall, increasing strategic options.

In another example of an external system 128, with regard to Virtual Reality, video wall software can be used to create a totally-virtual video wall system that would function exactly the same was as physical systems, only the video wall would be in virtual space. Viewers could access the virtual video wall 180 using high resolution HMDs, high resolution projection and multi-projector systems, and other emerging display systems. VR video walls 180 can be integrated on the same network as physical video walls 180 and they can share attributes and content—making this a viable technology for remote video wall monitoring. The internal structure of the videowall engine is also adaptable to accommodate standard VR technology and provide an alternative immersive display system for viewing that does not require HMDs or glasses In a further example, with regard to Augmented Reality as an external system 128, a video wall 180 can integrate with Augmented Reality systems that overlay virtual imagery on top of images of physical reality. The internal structure of the videowall engine is adaptable to accommodate AR technology.

In yet another example, regarding Stereoscopic Video as an external system 128, a video wall system can be adapted to deliver stereoscopic content using either active or passive delivery systems. A video wall system can enable the dynamic convergence of stereoscopic content making it possible to program the visual elements to move along the "z-axis"—appearing either closer to or farther from the audience.

Likewise, in connection with AutoStereoscopic Video as an external system 128, a video wall system can deliver autostereoscopic content that appears to be 3D without the use of any glasses. A video wall 180 can deliver pre-produced or real-time converted AS3D imagery, depending on the specific AS3D display system in the deployment.

Use Examples

As mentioned above, a video wall 180 using the system 100 provides a new display format (herein referred to as a "wallsite") that is similar to a "website," except the video wall 180 is comprised of multiple screens or a large screen display broken up into multiple areas; and it is designed for use in public spaces, group interaction, or as an individual interface capable of handling massive amounts of visual data. Wallsites could become as ubiquitous as websites for any organization or individual who deals with massive amounts of visual data, or requires the level of high impact delivery of complex information, content and messaging that a video wall 180 enables.

Entertainment Delivery (e.g., theatrical systems) is an area where wallsites can find use. A wallsite displayed on a video wall 180 can deliver all forms of digital entertainment including, but not limited to, long-form narrative movies, music-oriented "songbook" shows, live or pre-produced multi-screen concert performances, and a wide range of other types of unique entertainment experiences. A wallsite-based entertainment product can require out-of-home participation and may not be experienced over the internet or on a mobile device. One particular benefit is that wallsite-based entertainment is not susceptible to hacking or piracy. A wallsite can also function as dynamic backdrops for theatrical or performing arts productions, or visual support for rock shows and other forms of live or pre-produced entertainment.

Other areas where wallsites can find use are Arts Education and Art Delivery (e.g., museums). A video wall 180 installation in a museum can provide information on existing or upcoming exhibitions. A video wall 180 installation in a museum can provide access to broader/deeper arts education on current or upcoming exhibitions; access to data on local servers, through network control center, or through wider internet access. A video wall 180 installation can also serve to convey various information including, but not limited to, donor recognition, and community and membership development announcements. A video wall 180 installation can also provide delivery of digital artwork created specifically for display on the video wall 180.

Another area where wallsites displayed on video walls 180 can be useful is in connection with General Education (e.g., K-12 Learning Centers). In one example, a general curriculum can be developed for staged evolution in K-12 classroom or learning center settings. In another example, K-6 students can be exposed to multi-screen systems as teaching devices through specific educational wallsite(s). In a further example, Middle School students can learn how to compose their own presentational wallsite. In another example, High School students can learn how to create their own interactive wallsite. Through this process, students can graduate High School with all the basic tools to work in the digital economy: computer programming, network programming, media design, production and postproduction, and complex project management.

In another example, a wallsite can be used in connection with Performing Arts (e.g., at Performing Arts Centers). A wallsite in a Performing Arts Center would power the delivery of specially produced performing arts content including, but not limited to, opera, music, dance, theater, or the like (all contained either completely or partially on the wallsite). Wallsite productions of this nature could tour to multiple cities, setting up in existing performing arts centers for a weeks-long run. Performing arts education and additional educational and performance programming can also be included. Wallsites can also provide Live teleconferencing of principal creatives for special event programming.

A wallsite can find application in the area of Financial Services (e.g., Intelligent Data Management). As Financial Services firms become increasingly sophisticated tech firms, the need to manage information in ever greater quantities and with ever greater speed is essential. Firms are no longer judged exclusively on how much money they can earn—but also on how sophisticated their technology is—how fast they can trade—or how far into the future can their algorithms can accurately predict. A financial services firm's wallsite (linked to the firm's AI and high-speed trading systems) becomes a valuable tool for management. A centralized wallsite control center in a financial services firm's global headquarters can help unify actions throughout the firm's global trading network. Video wall systems 100 can also facilitate efficient communications by acting as a smart teleconferencing system.

In another example, a wallsite can be used in connection with Research/Scientific Development Centers. Video walls 180 at Research and Scientific Centers facilitate knowledge production by giving researchers and scientists a new tool to discover connections between different sources and types of information—all synthesized on their video wall 180. Research video wall systems 100 are efficient at both finding information and at presenting it in a unique format. Authoring tools for the system 100 enable researchers, scientists and university educators to present their findings to groups and individuals in compelling formats that encourage discovery and learning—particularly when AI self-learning algorithms are included.

In yet another example, a wallsite can be used in connection with Network Control Centers (e.g., Civilian, Military, or the like). Video wall systems 100 in network control centers use AI to monitor and deliver information in the most useful formats possible. Civilian applications include, without limitation, security monitoring, network control center for public utilities, private facilities, and corporate campuses. Video wall systems 100 can respond instantly and reconfigure information according to rapidly changing criteria.

In an additional example, a video wall system 100 can be used in connection with Digital Signage Systems (e.g., Retail Signage Systems (e.g., in connection with Intelligent personalized targeting), Wayfinding (e.g., Convention Centers, Transportation Centers or the like)). Wallsites in retail environments, transport centers and other public locations can deliver targeted, sophisticated messaging in a compelling format. Facial recognition and biometric information gathered in real-time or via RFID or other technologies can be used to customize content and advertising to match viewers' interests. Wallsites in public facilities or corporate campuses can provide sophisticated wayfinding information that responds to the requests of individuals. Wayfinding systems can be linked with security systems and with targeted digital signage/advertising delivery.

Gaming Systems are another area where video walls 180 can be used. Wallsites can be configured as group gaming systems that allow groups of players to share a unique gaming experience. The combined resolution on the video wall 180 of a system 100 used for gaming can be greater than resolutions typically achieved with projection, LED or other display technologies. The multi-screen format of the video wall system 100 enables new forms of gameplay in terms of options/menu access. Gamers can use the multiple screens of the videowall to set up multiple views of different locations of the same game, gaining a strategic advantage over their rivals. Game producers can develop "wallsite only" zones for specific types of gameplay. Wallsites can also be deployed at gaming competition events as a means to track multiple players and groups.

Unless expressly stated otherwise, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

In addition, the claimed invention is not limited in size and may be constructed in various sizes in which the same or similar principles of operation as described above would apply. Furthermore, the figures (and various components shown therein) of the specification are not to be construed as drawn to scale.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "front," "rear," "left," "right," "inner," "outer," "beneath", "below", "lower", "above", "upper", "horizontal", "vertical", "lateral", "longitudinal" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Moreover, features described in connection with one embodiment of the invention may be used in conjunction with other embodiments, even if not explicitly stated above. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A computer implemented method for mapping video to a video wall comprising multiple screen displays, the method comprising:
   receiving, by one or more computing devices, content comprising pixel data;
   generating, by the one or more computing devices, a pixel space;
   associating, by the one or more computing devices, the pixel data with the pixel space;
   generating, by the one or more computing devices, one or more virtual cameras;
   capturing, by the one or more virtual cameras, a portion of the pixel space;
   outputting, by the one or more computing devices, the portion of the pixel space captured by the one or more virtual cameras for display on the video wall; and wherein pre-selected portions of the pixel data can be displayed separately on one or more of the screen displays in the video wall.

2. The method of the claim 1, wherein the content is video and the pixel data is a frame of the video, and wherein pre-selected portions of the pixel data can be displayed separately on one or more of the screen displays in the video wall, and other pre-selected portions of the pixel data can be displayed separately on one or more of the other screen displays in the video wall.

3. The method of claim 1, wherein the one or more computing devices generate a configuration file based on received inputs, wherein the configuration file selects the content and defines the size and shape of the pixel space.

4. The method of claim 1, wherein the video wall comprises two or more displays.

5. The method of claim 1, wherein the video wall is a virtual video wall.

6. The method of claim 1, wherein the video wall is a simulated video wall.

7. The method of claim 4, wherein one or more media transceivers are each associated with one or more displays.

8. The method of claim 7, wherein each of the one or more virtual cameras is associated with one or more of the one or more media transceivers.

9. The method of claim 8, wherein outputting the portion of the pixel space captured by the one or more virtual cameras for display on the video wall comprises:
  receiving, by each one or more transceivers, the portion of the pixel space captured by the one or more virtual cameras associated with that respective one or more transceivers;
  synchronizing playback on the one or more the displays; and
  displaying, by the one or more displays, the pixel space received by the one or more receivers.

10. The method of claim 1, wherein the method further comprises processing the pixel data according to instructions provided by the videowall engine or by an integrated external system.

11. A system for mapping video to a video wall comprising multiple screen displays, the system memory storing instructions, the instructions executable by the one or more computing devices, wherein the instructions comprise:
  receiving, by the one or more computing devices, content comprising pixel data; generating, by the one or more computing devices, a pixel space;
  associating, by the one or more computing devices, the pixel data with the pixel space;
  generating, by the one or more computing devices, one or more virtual cameras;
  capturing, by the one or more virtual cameras, a portion of the pixel space; and
  outputting, by the one or more computing devices, the portion of the pixel space captured by the one or more virtual cameras for display on one or more of the display screens in the video wall.

12. A non-transitory computer-readable medium storing instructions that, when executed by one or more processors, cause the one or more processors to perform the steps of:
  receiving content comprising pixel data;
  generating a pixel space;
  associating the pixel data with the pixel space; generating one or more virtual cameras; capturing a portion of the pixel space;
  outputting the portion of the pixel space captured by the one or more virtual cameras for display on the video wall comprising multiple screen displays; and
  a preselected portion of the pixel data is displayed on one or more of the screen displays, and another preselected portion or other portions of the pixel data is displayed on other of the screen displays in the video wall.

* * * * *